US011188779B2

(12) United States Patent
Milis et al.

(10) Patent No.: US 11,188,779 B2
(45) Date of Patent: Nov. 30, 2021

(54) IMAGE PROCESSING APPARATUS

(71) Applicant: I.R.I.S., Mont-Saint-Guibert (BE)

(72) Inventors: Brecht Milis, Lier (BE); Michel Dauw, Machelen (BE); Frédéric Collet, Etterbeek (BE)

(73) Assignee: I.R.I.S., Mont-Saint-Guibert (BE)

( * ) Notice: Subject to any disclaimer, the term of this patent is extended or adjusted under 35 U.S.C. 154(b) by 175 days.

(21) Appl. No.: 16/292,130

(22) Filed: Mar. 4, 2019

(65) Prior Publication Data
US 2019/0279018 A1 Sep. 12, 2019

(30) Foreign Application Priority Data

Mar. 8, 2018 (GB) ..................................... 1803748

(51) Int. Cl.
G06K 9/44 (2006.01)
G06K 9/46 (2006.01)
(Continued)

(52) U.S. Cl.
CPC .............. G06K 9/44 (2013.01); G06K 9/2054 (2013.01); G06K 9/3233 (2013.01); G06K 9/346 (2013.01);
(Continued)

(58) Field of Classification Search
CPC ........ G06K 9/44; G06K 9/2054; G06K 9/346; G06K 9/3233; G06K 9/4604;
(Continued)

(56) References Cited

U.S. PATENT DOCUMENTS 6,160,913 A 12/2000 Lee et al.
6,185,334 B1 2/2001 Cheung et al.
(Continued)

FOREIGN PATENT DOCUMENTS

EP 1455304 A2 9/2004
JP 2004096375 A 3/2004
JP 2008236126 A 10/2008

OTHER PUBLICATIONS

Xiaoqing Liu et al: "An edge-based text region extraction algorithm for indoor mobile robot navigation", Mechatronics and Automation, 2005 IEEE International Conference Niagara Falls, ON, Canada Jul. 29-Aug. 1, 2005, pp. 701-706, vol. 2, Jul. 29, 2005, IEEE, Piscataway, NJ, USA.

(Continued)

Primary Examiner — Jaime M Holliday
(74) Attorney, Agent, or Firm — Canon U.S.A., Inc. IP Division

(57) ABSTRACT

Processing a dithered image comprising a grid of pixels including defining an array of pixels corresponding to a sub-region of the image; performing edge detection along the rows and the columns of the array; counting the number of edges detected along the rows of the array to determine the number of horizontal edges in the array; counting the number of edges detected along the columns of the array to determine the number of vertical edges in the array; identifying whether the sub-region is dithered based on the number of horizontal and vertical edges in the array; and selectively processing the corresponding sub-region of the image based on whether or not the sub-region is identified to be dithered. The identification step may also be based on the lengths of segments of similar pixels in the lines of the array.

17 Claims, 11 Drawing Sheets

(51) Int. Cl.
  *H04N 1/40* (2006.01)
  *G06K 9/20* (2006.01)
  *G06K 9/34* (2006.01)
  *G06K 9/32* (2006.01)
  *G06T 5/00* (2006.01)
  *G06T 7/10* (2017.01)
  *G06T 7/13* (2017.01)

(52) U.S. Cl.
  CPC ......... *G06K 9/4604* (2013.01); *G06K 9/4642* (2013.01); *G06T 5/00* (2013.01); *H04N 1/40075* (2013.01); *G06K 2209/015* (2013.01); *G06T 7/10* (2017.01); *G06T 7/13* (2017.01); *G06T 2207/20112* (2013.01); *G06T 2207/20172* (2013.01); *G06T 2207/30176* (2013.01)

(58) Field of Classification Search
  CPC ........... G06K 9/4642; G06K 2209/015; H04N 1/40075; H04N 1/40062; G06T 5/00; G06T 2207/10008; G06T 2207/30176; G06T 5/002; G06T 7/187; G06T 7/13; G06T 7/10; G06T 7/90; G06T 2207/20112; G06T 2207/20172
  See application file for complete search history.

(56) References Cited

U.S. PATENT DOCUMENTS

| | | | |
|---|---|---|---|
| 6,347,160 B1 | 2/2002 | Cheung et al. | |
| 6,473,525 B1* | 10/2002 | Cheung | H04N 1/40075 345/596 |
| 2002/0031276 A1* | 3/2002 | Yagishita | H04N 1/417 382/252 |
| 2004/0169890 A1 | 9/2004 | Maurer | |
| 2008/0309955 A1* | 12/2008 | Lee | H04N 1/4056 358/1.9 |
| 2009/0021792 A1* | 1/2009 | Shin | H04N 1/4092 358/3.15 |
| 2015/0339827 A1* | 11/2015 | Oka | H04N 1/52 382/199 |
| 2016/0358312 A1* | 12/2016 | Kolb, V | G06T 3/40 |

OTHER PUBLICATIONS

Shiufun Cheung et al: "Low-memory low-complexity inverse dithering", Proceedings of SPIE Medical Imaging 1997, vol. 3648, Dec. 22, 1998, 12 pages, Bellingham, WA.

Miceli C M et al: "Inverse Halftoning", Journal of Electronic Imaging, SPIE—International Society for Optical Engineering, Apr. 1, 1992, pp. 143-151, vol. 1, No. 2, Bellingham, WA.

* cited by examiner

EDGE DETECTION

SEGMENT DETECTION

SAMPLING

IMAGE PROCESSING APPARATUS

CROSS-REFERENCE TO RELATED APPLICATIONS

This application claims the benefit under 35 U.S.C. § 119(a)-(d) of United Kingdom Patent Application No. 1803748.1, filed on Mar. 8, 2018 and titled "IMAGE PROCESSING APPARATUS". The above cited patent application is incorporated herein by reference in its entirety.

FIELD

This invention generally relates to an image processing method and apparatus. More specifically, but not exclusively, the invention relates to a method and apparatus for processing an image for a subsequent optical character recognition (OCR) process by, for example, identifying which regions of the input image are dithered.

BACKGROUND

It is known that image processing apparatuses may be used to recognise text and other objects in an image.

For example, OCR apparatuses are often used to recognise and convert text in an input digital image into machine-encoded form such as ASCII code. The image may be, for example, a PDF of a scanned document that is received by an OCR apparatus from a scanner. However, alternatively of course, the image may be received from other sources such as a computer and/or in other file formats such as TIFF or JPEG.

Typically, to improve the chances of successfully recognising text in an input image, OCR systems pre-process the input image to, for example, separate the text from the background data (e.g. to separate the text from the rest of the image). This separation process generally involves binarizing the image to selectively convert the text into white and everything else into black (or vice versa).

However, some input images are formed using dithering, which is a common imaging technique for creating the illusion of colour depth from a limited colour palette. Such dithered images, or dithered regions of an image, result in non-uniform backgrounds which can complicate the binarization process and lead to dotted noise in the binary image. This noise can reduce the effectiveness of the binarization step at separating the text from the background, and consequently can significantly reduce the accuracy and speed of a subsequent OCR process. A further issue with dithered backgrounds is that they make it difficult to set an appropriate binarization threshold for separating all of the text and this, consequently, can lead to some text zones being incorrectly set to the same colour as the background data.

To suppress/remove the effects of dithering in an input image, some prior image processing methods smooth the input image during the pre-processing stage, possibly prior to binarization. A drawback with such approaches is that they require additional processing time and resources to smooth the entire input image. Furthermore, it can be difficult to set an appropriate smoothing level which does not overly blur and reduce the contrast of the text. For at least these reasons, these prior processing methods can reduce the effectiveness, quality and speed of the binarization and/or character recognition stages.

There is a need in the art to provide an image processing method and apparatus for addressing at least some of the above issues.

SUMMARY

From a first aspect the invention provides a method for processing a dithered image comprising a grid of pixels (preferably prior to object detection processing), the method comprising:
  defining an array of pixels corresponding to a sub-region of the image; performing edge detection along the rows and the columns of the array;
  counting the number of edges detected along the rows of the array to determine the number of horizontal edges in the array;
  counting the number of edges detected along the columns of the array to determine the number of vertical edges in the array;
  identifying whether the sub-region is dithered based on the number of horizontal and vertical edges in the array; and
  selectively processing the corresponding sub-region of the image based on whether or not it is identified to be dithered.

From a second aspect the invention provides a method for processing a dithered image comprising a grid of pixels (preferably prior to object detection processing), the method comprising:
  defining an array of pixels corresponding to a sub-region of the image;
  detecting segments of similar pixels in the lines of the array, wherein the difference in pixel value between neighbouring pixels in a segment is less than a predetermined contrast threshold;
  identifying whether the sub-region is dithered based on the lengths of the segments; and
  selectively processing the corresponding sub-region of the image based on whether or not it is identified to be dithered.

Accordingly, it will be seen that provided herein are methods for selectively processing a given sub-region of an image based on whether or not the sub-region is identified to be a dithered part of the image. In this way, different sub-regions of an image may be processed differently to better handle the dithering therein.

The selective processing may comprise deciding "whether to" and/or "how to" process the corresponding sub-region.

For example, the selective processing may comprise applying a dither removal process to the sub-region of the image if the sub-region is identified to be dithered, and optionally not applying a dither removal process to the sub-region of the image if the sub-region is not identified to be dithered. In this way, processing resources may be saved by not applying the dither removal process to sub-regions which are not dithered.

Additionally or alternatively, the selective processing may comprise applying a binarization technique with adaptive thresholding to adapt to the different conditions between dithered and non-dithered regions. For example, the selective processing step may comprise (i) processing the sub-region of the image with a binarization process having a first binarization threshold if the sub-region is identified to be dithered, and (ii) processing the sub-region of the image with a binarization process having a second, different binarization threshold if the sub-region is not identified to be dithered. In this way, the binarization technique may more effectively separate text from the background of the image.

In other examples, image processing techniques other than binarization or dither removal may be adaptively applied (e.g. by changing one or more of their control settings) to a sub-region of the image based on whether or not the sub-region is identified to be dithered.

Thus, in general, it will be seen that the selective processing step may comprise processing the sub-region of the image if it is identified to be dithered, and optionally not processing the sub-region if it is not identified to be dithered. Alternatively, the selective processing step may comprise processing the sub-region of the image according to a first process if it is identified to be dithered, and processing the sub-region of the image according to a second, different process if the sub-region is not identified to be dithered.

The dither removal process may comprise applying a smoothing function to the corresponding sub-region of the image.

In some cases, the methods may also comprise determining the average length of the edges (i.e. the average edge length) in the sub-region of the image, and setting a control parameter of the dither removal process for controlling the level of dither removal to a value based on the determined average edge length. Preferably, the smoothing radius is set to a value based on the average edge length—because it provides optimised smoothing without overly blurring text and/or other objects that may be present in the image. Preventing over blurring is of course important for improving the accuracy of subsequent objecting detection processes (e.g. subsequent OCR processes).

The dither removal process may be arranged to at least reduce the dithering. Ideally, however, the dither removal process substantially removes the dithering.

Thus, it will be appreciated that the methods may selectively process an image having a dithered region to provide an improved image. Preferably the methods selectively process the image prior to an object detection process such as an OCR process.

It will also be seen that the edge detection detects edges along the lines of the array (i.e. along the rows and columns of the array).

The edge detection method may be seen as an invention in its own right and thus may provide a further aspect of the invention in itself. Preferably, the edge detection comprises:
  (i) detecting local extremums (e.g. a local maximum and a local minimum) along a line;
  (ii) identifying successive local extremum pairs of opposing types (e.g. a local minimum followed by a local maximum);
  (iii) identifying the local maximum and/or local minimum in an identified successive local extremum pair of opposing types to be an edge.

A local minimum may be a pixel which has a value which is either (i) lower than both of its neighbouring pixels or (ii) the same as one of its neighbouring pixels and lower than the other neighbouring pixel. Similarly, a local maximum may be a pixel which has a value which is either (i) higher than both of its neighbouring pixels or (ii) the same as one of its neighbouring pixels and higher than the other neighbouring pixel. The neighbouring pixels are preferably on the same line as the local minimum/maximum and are directly adjacent to the local minimum/maximum.

A local maximum (or a local minimum) in a successive local extremum pair of opposing types may be identified to be an edge if it is determined to satisfy (i) a criterion based on the difference in pixel value between the local maximum and the local minimum in the pair, and/or (ii) a criterion based on the number of pixels between the local maximum and the local minimum (i.e. based on the edge length).

For example, in preferred examples, a local maximum (or a local minimum) in a successive local extremum pair of opposing types is identified to be an edge if (i) the absolute delta in pixel value between the local minimum and the local maximum exceeds a contrast threshold (e.g. a minimum absolute delta); and/or (ii) the number of pixels between the local maximum and the local minimum does not exceed an edge length threshold (e.g. a maximum edge length).

It will be appreciated that the number of pixels between a local minimum and a local maximum provides an edge length.

The criterion based on the difference in pixel value between the local maximum and the local minimum in the pair, and the criterion based on the edge length may each be used to identify edges of a certain type—e.g. they may be used to identify edges of text of one or more types of font.

Thus, in view of the above, it will be appreciated that detected edges herein may be a local extremum in a successive local extremum pair of opposing types which satisfies (i) contrast criterion based on the difference in pixel value between the local maximum and the local minimum in the pair, and/or (ii) edge length criterion based on the number of pixels between the local maximum and the local minimum.

Notwithstanding the above, it will also be seen that the methods herein may identify dithered regions based on (i) the number of horizontal edges and vertical edges; and/or (ii) the lengths of segments of similar pixels. Ideally, for the most accurate results, the dithered regions are identified based on both (i) the number of horizontal edges and vertical edges, and (ii) the lengths of segments of similar pixels.

In one set of examples, the step of identifying whether a sub-region is dithered may comprise determining whether the number of horizontal edges and the number of vertical edges each exceed a predetermined threshold count. The predetermined threshold count may define the minimum number of edges and, in some cases, it may be scaled based on the average edge length in the array. In this respect, the methods may also comprise determining the average edge length in the array. In certain cases, the predetermined threshold count may be based on the area of the sub-region—e.g. it may depend on the area of the sub-region which the array corresponds to. The predetermined threshold may also depend on an expected minimum percentage of edges in the sub-area.

Additionally or alternatively, the step of identifying whether a sub-region is dithered may comprise determining whether the number of horizontal edges relative to the number of vertical edges exceed a predetermined ratio. The predetermined ratio ideally sets a maximum ratio of horizontal edges to vertical edges but, of course, it could alternatively set a minimum ratio. The predetermined ratio may be used to identify certain shapes of dithering—for example it may be used to look for circular shaped dithering.

In one set of examples, the lengths of the segments may be weighted according to their size; and the step of identifying whether the sub-region is dithered comprises determining whether the sum of the weighted lengths is greater than a predetermined sum threshold. In certain examples, the predetermined sum threshold may be scaled based on an average edge length of the array. In this respect, the methods may also comprise performing edge detection along the lines of the array and determining the average edge length in the array.

In certain examples, the methods may also comprise: if the sub-region is identified to be dithered, setting a pixel of a mask (e.g. a dithering identification mask) to a first value (e.g. black), wherein the set pixel is co-located with the centre pixel of the sub-region of the image—i.e. wherein the set pixel in the mask has the same coordinates as the centre pixel of the sub-region in the image. Similarly, the methods may also comprise: if the sub-region is not identified to be dithered, setting a pixel of the mask to a second value (e.g. white), wherein the set pixel is co-located with the centre pixel of the sub-region of the image. Ideally, the second value is different to the first value.

It will be appreciated that the black pixels of the mask identify the locations of the dithered regions in the image. Accordingly, the mask provides a map which can be used by subsequent processes to selectively step through (e.g. selectively process) the dithered/non-dithered regions.

In certain examples, the methods may also comprise binarizing the processed image to generate a binary image for subsequent processing—e.g. the methods may comprise binarizing the image after selectively applying a smoothing function.

In yet further examples, the methods may also comprise performing an objection detection process (e.g. an OCR process) on the processed image—e.g. on the selectively processed image or the binarized image.

In some examples, the defined array of pixels is a selected sub-region of pixels of the image. For example, the pixels of a sub-region of the image may define the pixels of the array.

In one set of examples, the methods may comprise sampling the image to provide a sampled image. In these cases, the defined array of pixels may be a selected sub-region of pixels of the sampled image. That is, for example, the pixels of the sampled sub-region may define the pixels of the array.

In certain examples, the image is sampled according to a sampling factor based on the average edge length of the horizontal and/or vertical edges in the image. Thus, the methods may comprise determining the average edge length of the horizontal and/or vertical edges in the image.

Preferably, the step of defining an array of pixels comprises applying a sliding window function to the image/sampled image. The pixels within the sliding window preferably define the pixels of the array.

Ideally, the methods define an array centred on each pixel of the image/sampled image (e.g. by centring a sliding window over each pixel of the image/sampled image), and each array is analysed to identify whether its corresponding sub-region is dithered based on (i) the number of horizontal edges and vertical edges in the array; and/or (ii) the lengths of segments of similar pixels in the array. This analysis may of course comprise performing the edge detection and/or segment detection processes described herein. In addition, the sub-regions corresponding to the arrays may each be selectively processed according to the selective processing herein.

It will also be seen that since the array corresponds to a sub-region of the image, the methods herein may also identify the array to be dithered based on the lengths of the segments. That is, for example, if the sub-region is identified to be dithered, the array may also be identified to be dithered, or vice versa.

The image may be received from an input image source such as a scanner, camera, computer or smartphone. The received image may be a greyscale image or a colour image. However, if the received image is in colour, the method may comprise converting the image into greyscale.

The invention extends to an image processing apparatus comprising processing means arranged to process an image having a grid of pixels, preferably prior to object detection processing, according to any of the methods described herein.

The processing means may be a single processor or it may be a set of components comprising a processor and other logical units.

For example, the image processing apparatus may comprise a processor, an edge detector, a segment detector, a dithered region detector and a selective processing unit. The processor may be arranged to define an array of pixels. The edge detector may be arranged perform the edge detection and count the number of edges. The segment detector may be arranged to detect the segments. The dithered region detector may be arranged to identify whether a sub-region is dithered. The selective processing unit may be arranged to selectively process sub-regions of the image. It will be appreciated from the following description that the processing means may comprise other logical units, and that the logical units of the processing means may perform other steps of the methods described herein.

The invention further extends to a programmable apparatus programmed to carry out any of the methods of processing an image described herein.

The invention further extends to a computer program product adapted to cause programmable apparatus to carry out any of the methods of processing an image described herein.

The computer program product may be software, which may be stored in a non-transitory computer readable medium. Thus the invention further extends to a non-transitory computer readable medium comprising software adapted when run on programmable apparatus (e.g. an image processing apparatus) to carry out any of the herein described methods of processing an image.

In a further aspect, there may be provided software adapted to cause an image processing apparatus to:
define an array of pixels corresponding to a sub-region of the image;
performing edge detection along the rows and the columns of the array;
count the number of edges detected along the rows of the array to determine the number of horizontal edges in the array;
count the number of edges detected along the columns of the array to determine the number of vertical edges in the array;
identify whether the sub-region is dithered based on the number of horizontal and vertical edges in the array; and
selectively process the corresponding sub-region of the image based on whether or not the sub-region is identified to be dithered.

In a yet further aspect, there may be provided software adapted to cause an image processing apparatus to:
define an array of pixels corresponding to a sub-region of the image;
detect segments of similar pixels in the lines of the array, wherein the difference in pixel value between neighbouring pixels in a segment is less than a predetermined contrast threshold;
identify whether the sub-region is dithered based on the lengths of the segments; and
selectively process the corresponding sub-region of the image based on whether or not the sub-region is identified to be dithered.

It should be understood that any of the features described herein in relation to a particular set of embodiments/examples may be combined with the features of another set of embodiments/examples without any limitations other than those imparted by the broadest aspects of the invention as defined hereinabove.

BRIEF DESCRIPTION OF THE DRAWINGS

Certain preferred examples of the invention will now be described, by way of example only, with reference to the accompanying drawings, in which.

DETAILED DESCRIPTION

Figure 1:
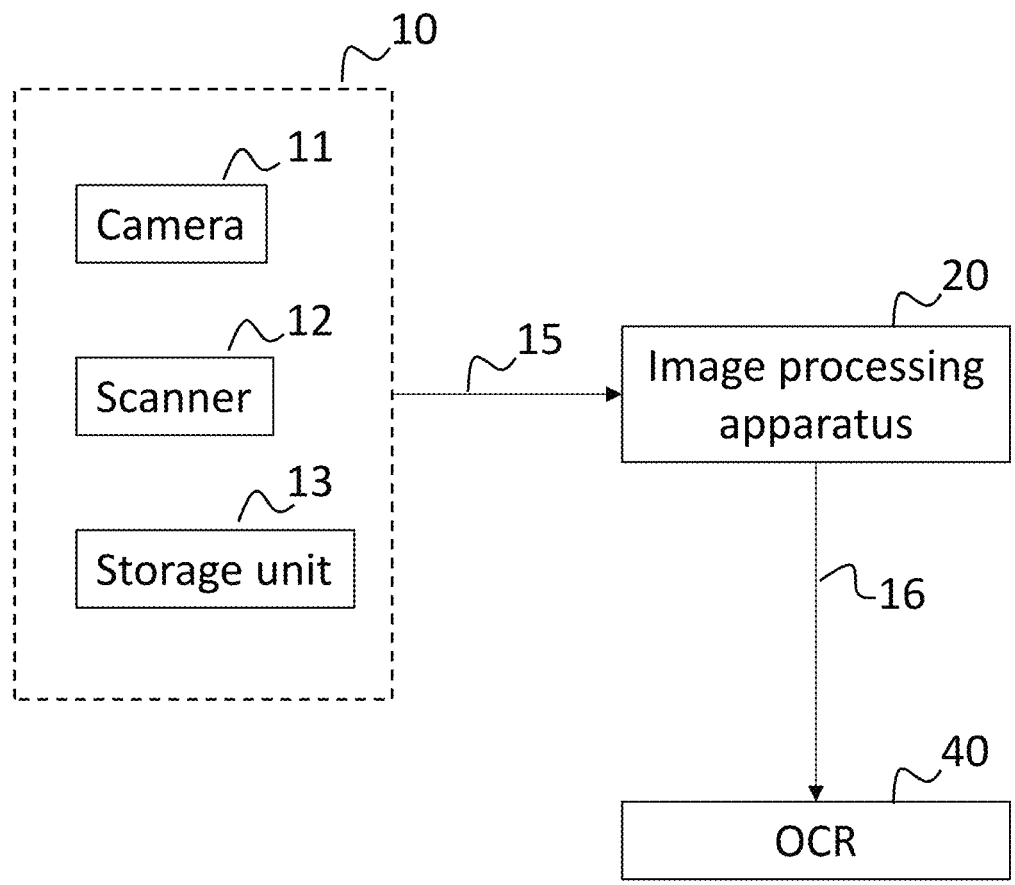
FIG. 1 is a schematic drawing of an imaging system according to an example of the present invention.

FIG. 1 shows an OCR system 1 comprising an image processing apparatus 20. The image processing apparatus 20 embodies the invention and is arranged to receive a digital input image 15 from an input image source 10. The input image source 10 may be, for example, a camera 11 (e.g. DSLR or smartphone), a scanner 12 (e.g. a flatbed scanner), a storage unit 13 or any other image source capable of providing a digital input image 15 to the image processing apparatus 20. The storage unit 13 may be any database, memory, disk drive or other data storage device configured to store a digital input image. Preferably, however, the storage unit 13 is a storage server or a memory of a computer.

The input image 15 comprises an array of pixels and defines at least one text region and at least one dithered region. The input image may be a colour image or a greyscale image, and be of any size or aspect ratio.

Figure 9:
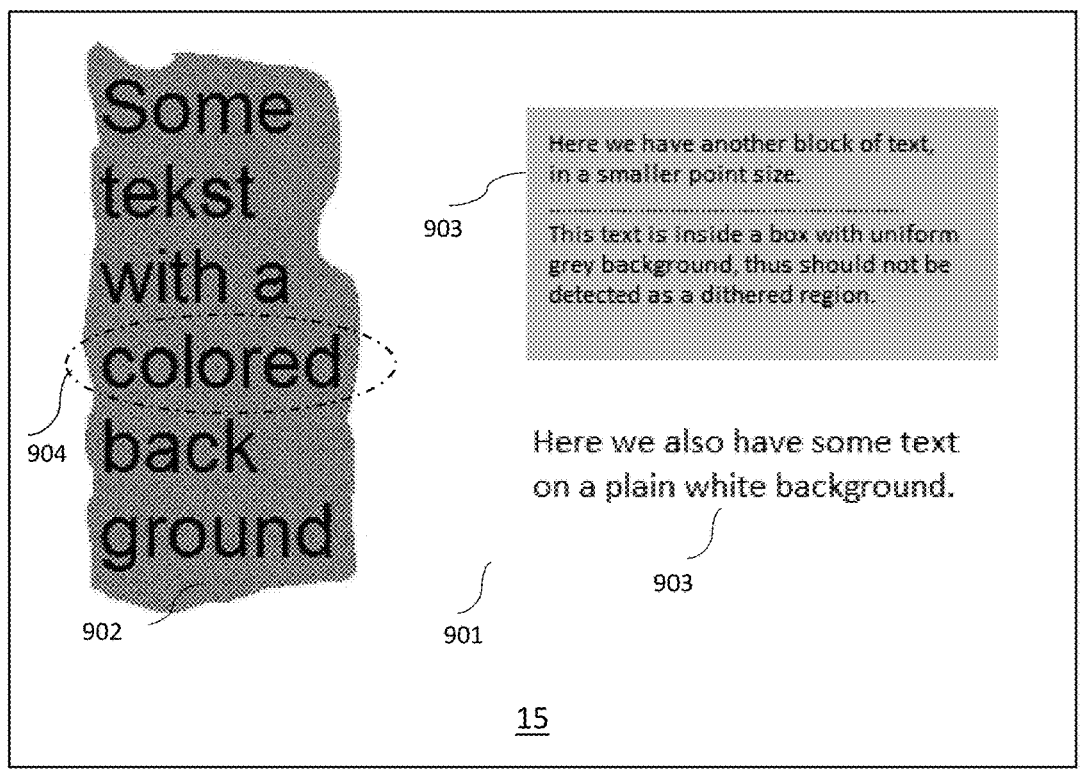
FIG. 9 illustrates an example of an input image having text in a dithered region and text in a white background region.

FIG. 9 shows an example of a greyscale input image 15 that has a white uniform background 901 with a dithered region 902. The input image 15 also has text of varying sizes. Some text appears on a white background region 903, and some text appears on a dithered region 904. In general, it is difficult for OCR systems to recognise text in dithered regions, particularly when they are small. Furthermore, it is difficult for such OCR systems to distinguish between uniform background regions comprising small text (e.g. 903), and background regions comprising dithered data (e.g. 902).

Figure 10:
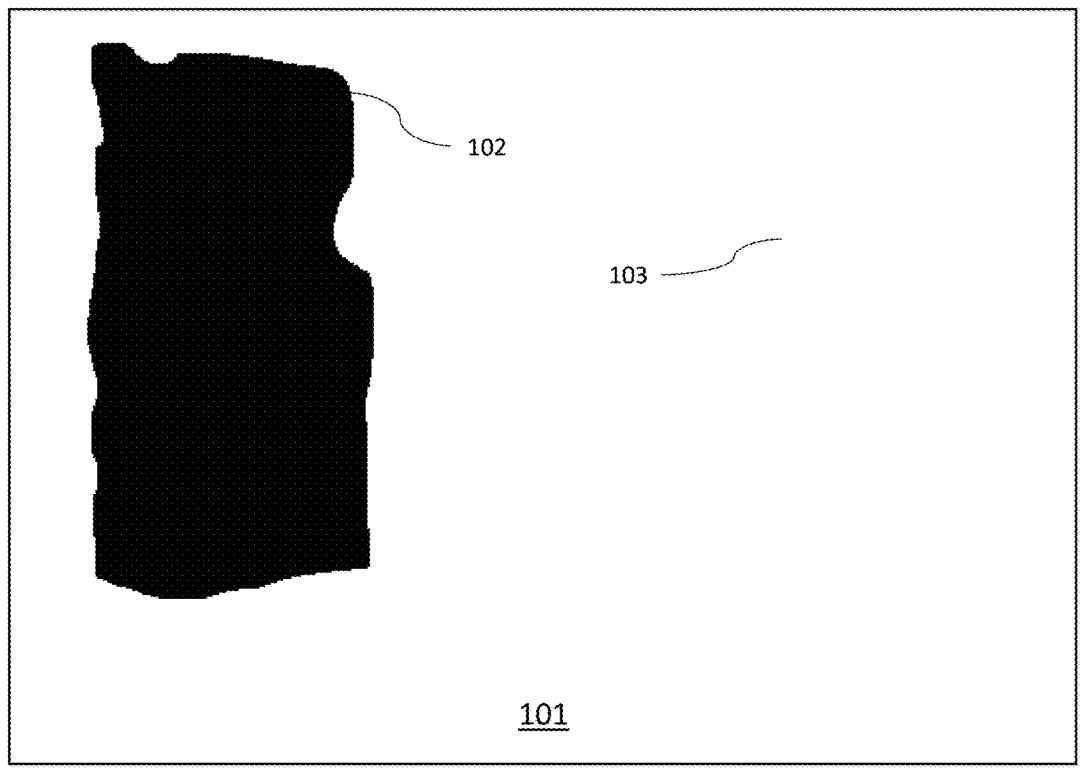
FIG. 10 illustrates an example of a dithered identification mask which may be generated based on the input image of FIG. 9.

As will be described in more detail below, the image processing apparatus 20 identifies the dithered region(s) in the input image 15 and preferably generates a mask (e.g. a dithering identification mask) to indicate the locations of the dithered regions in the input image 15. FIG. 10 provides an example of a dithering identification mask 101 that has been generated by processing the input image of FIG. 9 using a method in accordance with the dithered region identification process of FIG. 6. As shown, the dithering identification mask 101 is a binary image comprising black and white pixels. The black pixels 102 correspond to the regions which were identified to be dithered. Conversely, the white pixels 103 correspond to the regions which were not identified to be dithered.

In some examples, the image processing apparatus 20 may generate a processed image 16 by selectively applying an image processing function (e.g. a smoothing function or some other filter) to the parts of the input image 15 which have been identified to be dithered (e.g. 102). Ideally, the image processing apparatus 20 leaves the rest of the input image 15 in its original state—thus it will be seen that the processed image 16 may be the same as the input image 15, except for the smoothed regions. It will also be seen that the image processing apparatus 20 saves processing resources by not applying an image processing function to the entire input image 15. In some examples, the image processing apparatus selectively applies the image processing function based on the locations of the identified dithered regions in the dithering identification mask. In other examples, the image processing apparatus may apply an image processing function as soon as it determines that a currently analysed region of the input image 15 corresponds to a dithered region.

Figure 11:
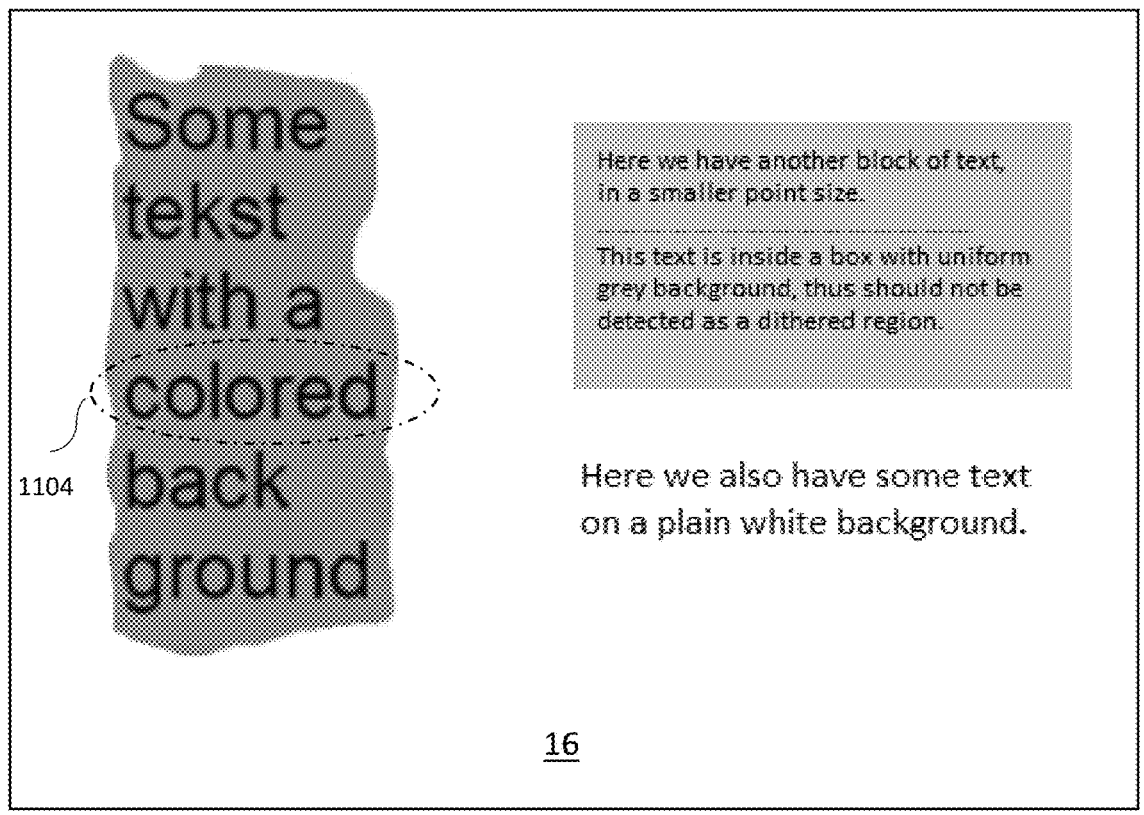
FIG. 11 illustrates an example of a processed image that has been generated by selectively smoothing the dithered regions of the input image of FIG. 9.
Figure 12A:
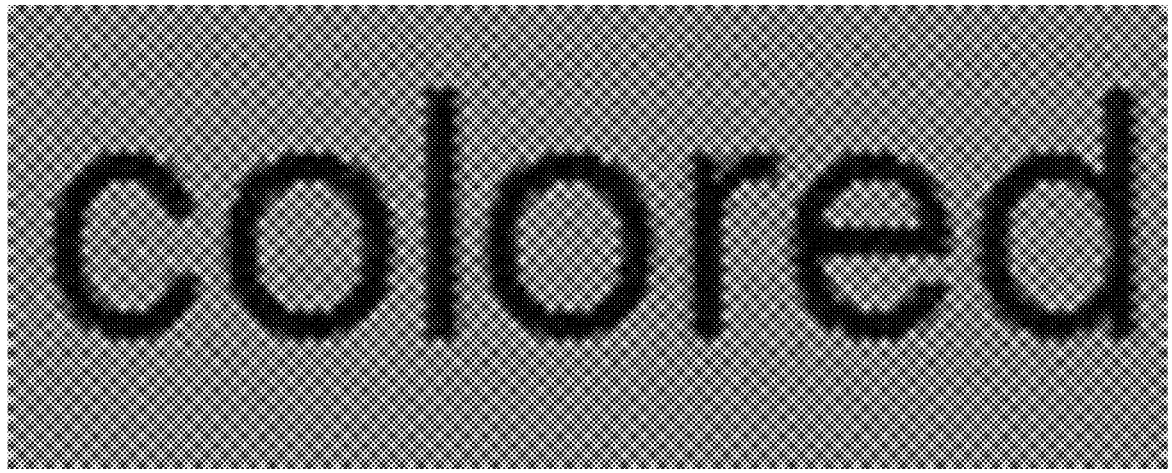
FIGS. 12A and 12B respectively show a magnified portion of the input image of FIG. 9 and the processing image of FIG. 11, for comparison.
Figure 12B:

Preferably, the image processing apparatus 20 applies a smoothing function to the identified dithered regions to generate a processed image 16. FIG. 11 shows an example of a processed image that has been generated by smoothing the dithered regions of the input image of FIG. 9. FIGS. 12A and 12B show magnified views of co-located regions of FIG. 9 and FIG. 11 for comparison. As shown, the level of dithering surrounding the word "colored" has been reduced in FIG. 12B in comparison to FIG. 12A.

Figure 2:
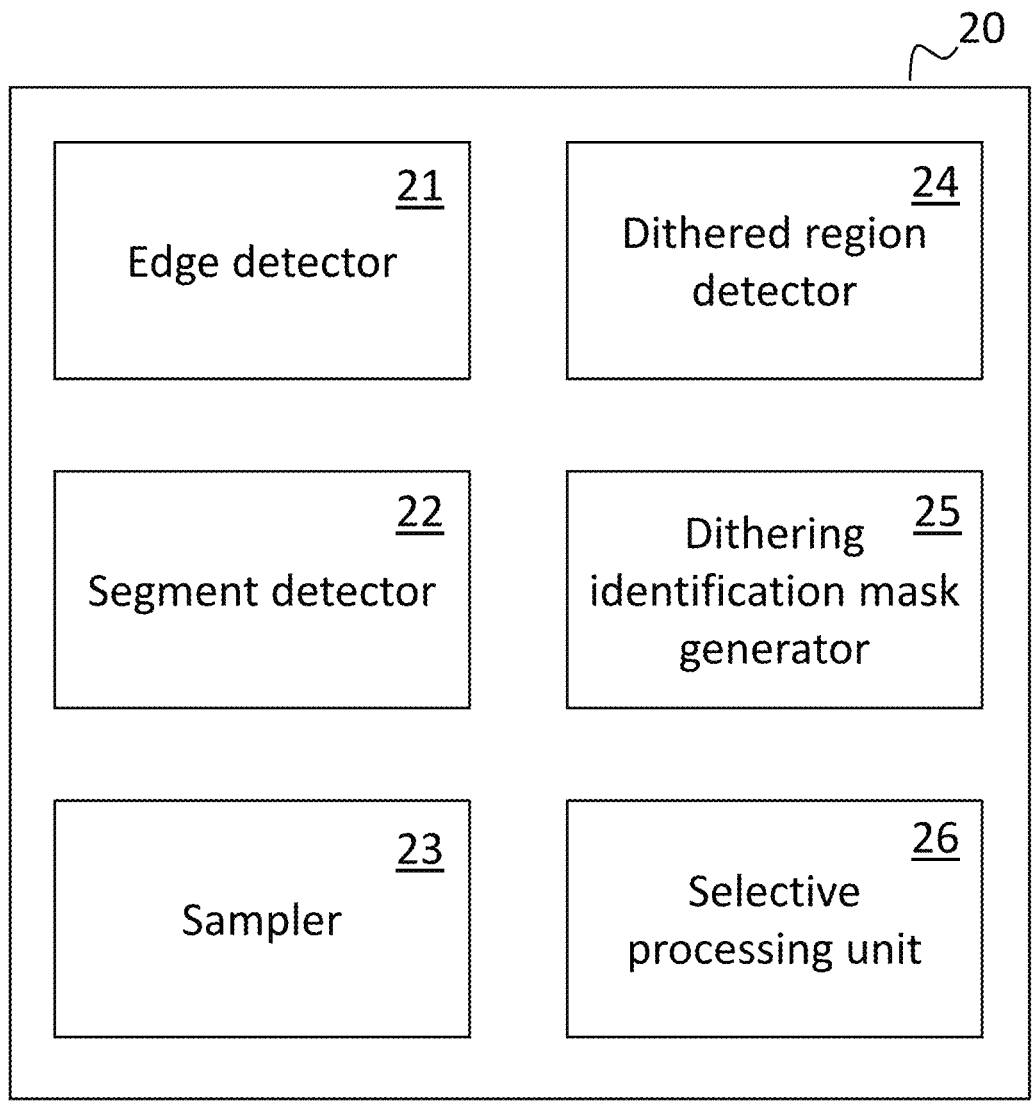
FIG. 2 is a schematic block diagram illustrating some functions of an image processing apparatus embodying the invention.

FIG. 2 shows some preferred components of the image processing apparatus 20 which include an edge detector 21, a segment detector 22, a sampler 23, a dithered region detector 24, a dithering identification mask generator 25, and a selective processing unit 26. These illustrated components may be separate logical units or their functions may be executed by a processor of the image processing apparatus 20. The processor 20 may also execute the functions of the OCR processing apparatus 40 or other object detection apparatus. The processor may be programmed to perform these functions by executing machine readable code. Thus, in certain examples, the functions of the image processing apparatus 20, the OCR 20 and/or an object detection process may form part of the same software product, which may be executed by a processor.

The edge detector 21 is arranged to execute any of the edge detection processes disclosed herein. The segment detector 22 is arranged to detect uniform segments of pixels in a given set of image pixels according to a segment detection process disclosed herein. The sampler 23 is arranged to sample an input image 15 to provide a lower resolution, sampled image. Preferably, the sampler 23 samples an input image 15 according to a sampling process disclosed herein. The dithered region detector 24 is arranged to determine whether a given set of image pixels is dithered. The set of pixels may be the pixels in a given window of an input/sampled image 15. The dithering identification mask generator 25 identifies which region(s) of an input image 15 is/are dithered using any of the dithered region identification processes disclosed herein. Preferably, the dithering identification mask generator 25 generates a binary mask (e.g. black and white mask) which maps out which of the pixels in the input image are part of a dithered region. The selective processing unit 26 is arranged to remove/reduce the dither in a dithered region of the image using a dither removing process disclosed herein.

Processed images 16 generated by the image processing apparatus 20 may be used in subsequent processes such as binarization, or OCR or other object detection process. It will be appreciated that the effectiveness of such subsequent processes may be improved by removing/reducing the dithering in the input image 15. For example, the effectiveness of a binarization step for separating the text from rest of the image will be improved by removing/reducing the dithering in an input image 15.

In FIG. 1, the image processing apparatus 20 provides the processed image 16 to an OCR processing apparatus 40 but in other examples it may, additionally or alternatively, provide the processed image to another type of object detection apparatus for subsequent processing or it may simply output the processed image 16 as an improved version of the input image 15. The OCR processing apparatus 40 may apply any standard character recognition process to convert the text in the processed image 16 into machine-encoded form such as ASCII code.

The image processing apparatus 20 may communicate with the input image source(s) and/or OCR processing apparatus 40 via a wired and/or wireless connection. The wireless connection may be a WiFi, a Bluetooth or a ZigBee connection. Further, part or all of the communication(s) may occur over a WAN (such as the internet) or a LAN. Accordingly, it will be noted that the system shown in FIG. 1 may comprise other conventional components (e.g. routers, receivers and/or transmitters) for facilitating the various communications. However, for the sake of simplicity, these conventional components are not shown in the drawings.

The image processing apparatus 20 may also have other conventional components, such as memory, a battery, etc, but these are omitted from the drawings for the sake of simplicity.

Figure 3:
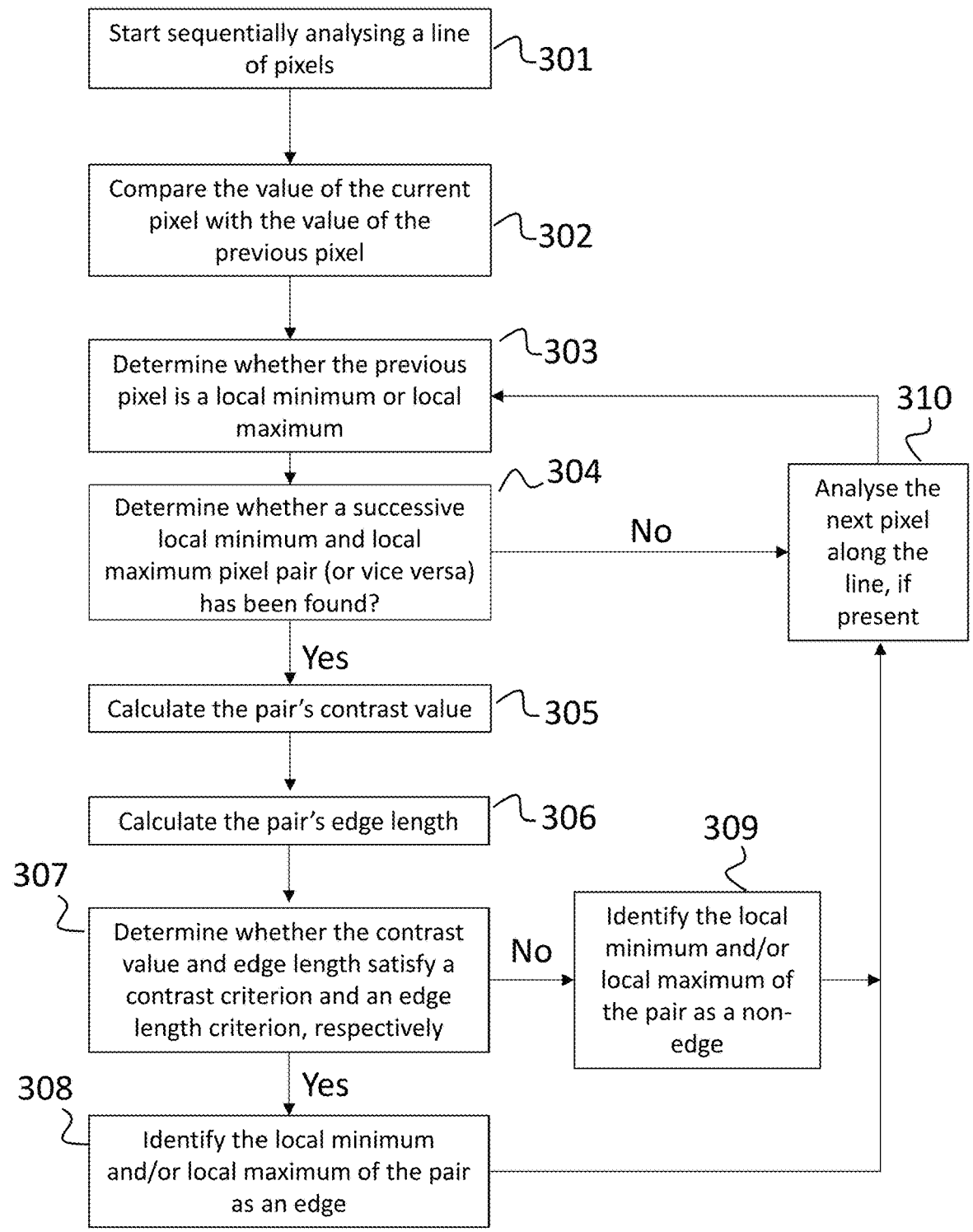
FIG. 3 illustrates an edge detection process according to an example of the present invention.

FIG. 3 shows an edge detection method which, as detailed below, is preferably used in examples herein to, for example, sample an input image 15 and determine whether a given set of pixels is dithered. An advantage of this method of edge detection is that it provides a fast way of detecting and characterising edges (e.g. characterising the length and gradient of an edge). The method also allows the values of summed area tables (i.e. integration tables) and/or circular buffers to be calculated as each line of pixels is analysed. However, the present invention is not necessarily limited to using this edge detection method, and it will be appreciated that the examples herein may alternatively use conventional edge detection methods to detect edges (e.g. horizontal and vertical edges) and conventional characterisation methods to characterise the edges (e.g. to characterise their edge lengths and contrast values); although possibly with a drop performance.

The edge detection method of FIG. 3 may be applied to a line of pixels of an image (e.g. input/sampled image). The line may be a horizontal line of pixels or a vertical line of pixels in an image. For example, in some processes (e.g. the sampling process), the edge detection method may be applied to an entire row or an entire column of the input image 15. In other processes (e.g. the dithered region determination process), the edge detection method may be applied to an entire row and/or an entire column of a window of an image (e.g. the edge detection method may be applied to one or more rows and/or columns of a sub-area of an image, wherein the sub-area may be defined by applying a sliding window to the image).

At step 301, the edge detection method starts sequentially analysing each pixel along a line, along a scan direction (e.g. from left to right or vice versa, or top to bottom or vice versa). At step 302, the method compares the value (e.g. intensity) of the currently analysed pixel with the value of the previous pixel. Based on this comparison the method determines whether the intensity profile of the image in this region is descending, ascending or flat. For example, if the value of current pixel is less than the previously analysed pixel, the method determines that the intensity profile across this region of the image is descending. Conversely, if the relative value of the current pixel is higher than or the same as the previous pixel, the method determines that the intensity profile is ascending or flat, respectively.

At step 303, the method determines whether the previous pixel is a local minimum or a local maximum. In general, a local minimum pixel has a lower value than one or both of its neighbouring pixels, and a local maximum pixel has a higher value than one or both of its neighbouring pixels. The previous pixel may be determined to be a local minimum pixel when the intensity profile changes from a descending profile to an ascending profile or a flat profile. Conversely, the previous pixel may be determined to be a local maximum pixel when the intensity profile changes from an ascending profile to a descending profile or a flat profile. If the intensity profile does not change and continues to be flat, the method may optionally increment the pixel position of the previously found local minimum or local maximum. For simplicity, the term local extremum is used herein to commonly refer to a local minimum or a local maximum.

At step 304, the method determines whether a successive local extremum pair of opposing types has been found (e.g. a local minimum followed by a local maximum, or vice versa). If a successive local extremum pair of opposing types is not found, the method proceeds to analyse the next pixel along the line at step 310.

If a successive local extremum pair of opposing types is found, the method proceeds to characterise the pair at steps 305 and 306. Specifically, the method calculates the absolute delta in pixel value between the local extremum pair (e.g. the difference in pixel value between a local minimum and a successive local maximum) to provide a contrast value at step 305. The method also calculates the number of pixels between the local extremum pair to provide an edge length at step 306. It will be appreciated that the contrast and edge length provides an indicator of the gradient between the local extremum pair. The edge length also provides an indicator of smoothness.

At step 307, the method determines whether the contrast calculated at step 305 satisfies a contrast criterion, and whether the edge length calculated at step 306 satisfies an edge length criterion. The contrast criterion is preferably satisfied when the calculated contrast exceeds a minimum contrast threshold. Similarly, the edge length criterion is preferably satisfied when the calculated edge length is below a maximum edge length threshold. The minimum contrast threshold and the maximum edge length threshold may each, respectively, define a minimum absolute delta in pixel value and a maximum edge length that is expected to occur for a genuine edge or type(s) of genuine edge. For example, the minimum contrast threshold may define the minimum absolute delta that is expected to occur for an edge of text of one or more types of font, and is preferably 20 or 40, or any number between 20 and 40. Preferably, the value of the minimum contrast threshold is a grey level value. The maximum edge length may define the maximum edge length for an edge of text of one or more types of font and is preferably 8 or 12, or any number therebetween. Thus, it will be appreciated that the edge length criterion and the contrast criterion may each be used to filter out false edges and/or undesirable edges.

At step 308, the method identifies the local maximum and/or the local minimum of the local extremum pair as an edge if the contrast criterion and the edge length criterion at step 307 are both satisfied. The identified edges may be characterised by the calculated contrast and edge length values at steps 305 and 306. Conversely, at step 309, the method identifies the local maximum and/or the local minimum of the local extremum pair as a non-edge if either or both of the contrast criterion and the edge length criterion are not satisfied.

At step 310, the method proceeds to analyse the next pixel along the line, if present. Once a line has been processed, the edge detection method may then be applied to sequentially analyse subsequent lines of an image/window of an image. In this way, edges in an entire image or window may be detected and characterised.

It will be appreciated that if the edge detection method is applied to a horizontal line, the method will detect and characterise horizontal edges. Conversely, if the method is applied to a vertical line, the method will detect and characterise vertical edges.

Although not shown in FIG. 3, the edge detection method may also update/generate an integration table (e.g. summed-area table) and/or an equivalent circular buffer for keeping a count of all the horizontal and/or vertical edges that the method has detected. The implementation of such integration tables and equivalent circular buffers will be familiar to the skilled person as they are common tools in computer science, but of course it will be appreciated that the use of such tables/buffers in the methods provided herein may not be known. The elements of an integration table and/or equivalent circular buffer are preferably updated/generated according to logical expression [1] when analysing horizontal lines. Conversely, if the vertical lines are analysed, the elements of an integration table and/or equivalent circular buffer are preferably updated/generated according to logical expression [2]. Preferably, the elements are updated/generated on the fly whenever the edge detection method analyses a line of pixels (e.g. after step 308 and before step 310).

$$\text{Element}(x,y)=\text{Element}(x,y-1)+\text{row\_sum} \quad [1]$$

$$\text{Element}(x,y)=\text{Element}(x-1,y)+\text{column\_sum} \quad [2]$$

Where:
Element $(x, y)$ is the element of the table/buffer associated with the image/window pixel at coordinates $(x, y)$;
Element $(x, y-1)$ represents the number of identified edges along the horizontal line of the image/window at the time of analysing pixel $(x, y-1)$;
Element $(x-1, y)$ represents the number of identified edges along the vertical line of the image/window at the time of analysing pixel $(x-1, y)$;
row_sum is the number of identified edges along the horizontal line of the image/window at the time of analysing pixel $(x, y)$; and
column_sum is the number of identified edges along the vertical line of the image/window at the time of analysing pixel $(x, y)$.

In addition to updating/generating a respective integration table/circular buffer for the number of horizontal edges and/or vertical edges, the edge detection method may also update/generate an integration table and/or an equivalent circular buffer for keeping a record of the sum of the edge lengths. The integration table/buffer for the sum of the edge lengths may be based on the edge lengths calculated during horizontal edge detection or vertical edge detection. The elements of the integration table/buffer for the sum of the edge lengths are preferably updated/generated in accordance with logical expression [3]. Like with the integration tables/buffers for the horizontal and vertical edge count, the elements of the integration table/buffer for the sum of the edge lengths are preferably updated/generated on the fly whenever the edge detection method analyses a line of pixels (e.g. after step 308 and before step 310).

$$\text{Element}(x,y)=\text{Element}(x,y-1)+\text{line\_sum} \quad [3]$$

Where:
Element $(x, y)$ is the element of the table/buffer associated with the image/window pixel at coordinates $(x, y)$;
Element $(x, y-1)$ represents the sum of the edge lengths along the line of the image/window at the time of analysing pixel $(x, y-1)$; and
line_sum is the sum of the edge lengths along the line of the image/window at the time of analysing pixel $(x, y)$.

In general, it will be appreciated that each element of an integration table and/or buffer is associated with a given pixel of an image/window of an image. Further, a given element of an integration table/buffer may provide an aggregate value. For example, a given element of an integration table/buffer for counting the number of horizontal edges, may provide the total number of horizontal/vertical edges that have been found by the edge detection method up to, and including, the point of analysing the pixel which is associated with the given element.

As will become more apparent from the rest of this description, the count of the horizontal and vertical edges and/or the sum of the edge lengths may be used in other processes herein—e.g. to sample an input image and/or detect a dithered region. In certain examples, it is preferable for these processes to use an integration table and/or equivalent circular buffer to determine these values because they are fast and resource efficient. However, it will be appreciated that these processes are not limited to using integration tables and/or circular buffers, and that they may alternatively use other means for determining these values; albeit possibly without the same speed and efficiency advantages. For example, in some examples, the processes may repeatedly count the number of horizontal edges whenever required.

Figure 4:
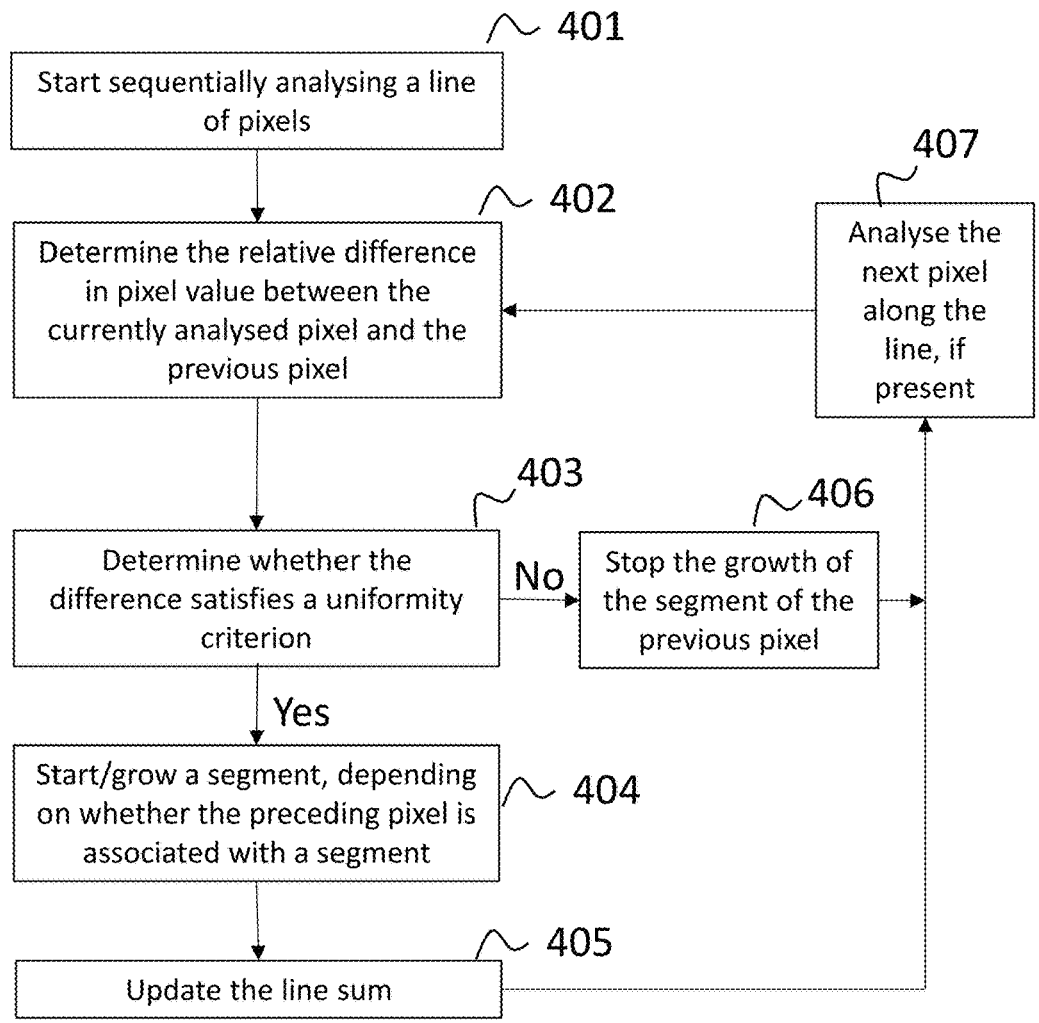
FIG. 4 is a segment detection process according to an example of the present invention.
Figure 7:
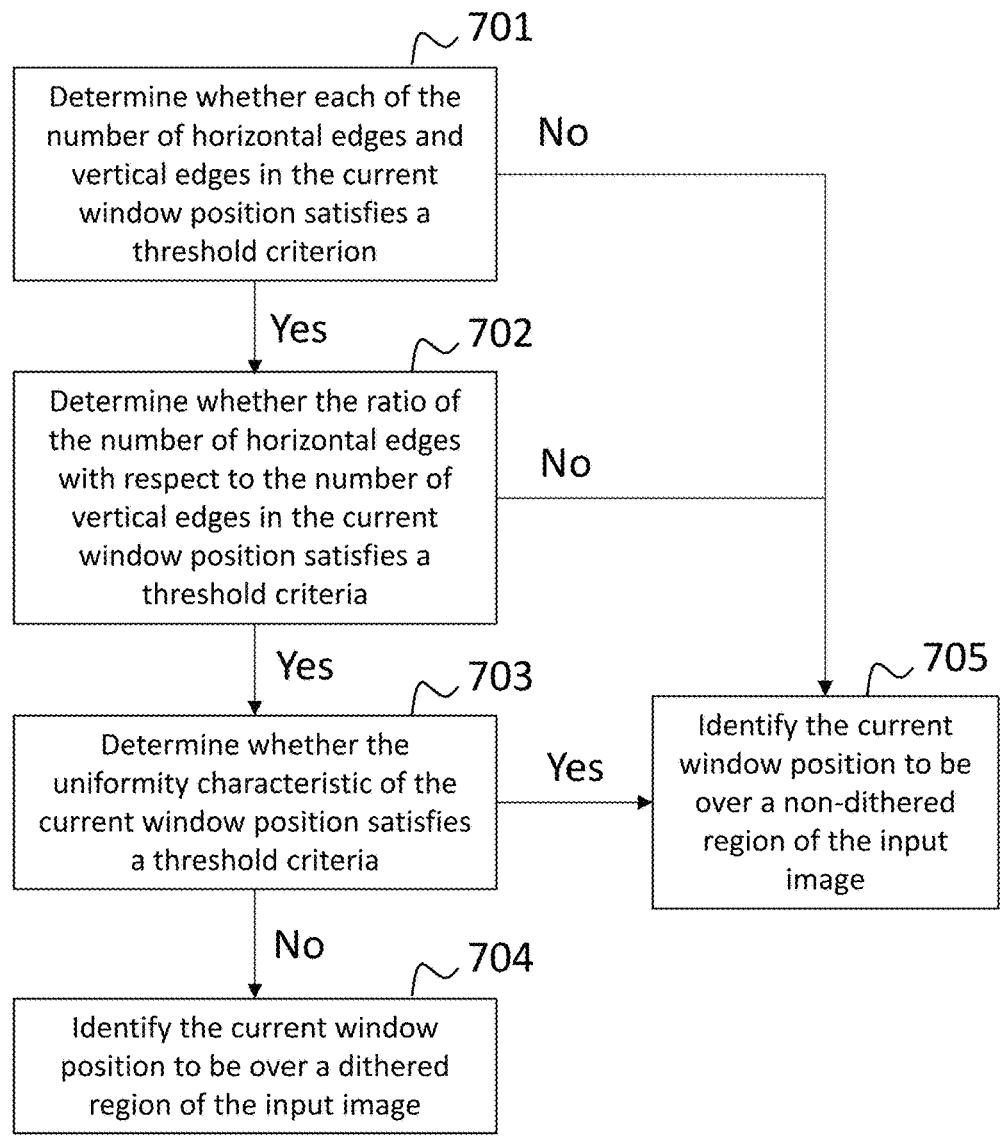
FIG. 7 is a dithered region determination process according to an example of the present invention.

FIG. 4 shows a segment detection method. The method identifies a segment of pixels which satisfy a uniformity criterion and, like the edge detection process, may be applied to a line of pixels of an image—e.g. during the dithered detection process of FIG. 7.

At step 401, the segment detection method starts sequentially analysing each pixel along a line (e.g. from left to right). At step 402, the method determines the absolute delta (i.e. the absolute difference) in value (e.g. intensity) between the currently analysed pixel and the previous pixel to provide a contrast value. The method then determines whether the absolute delta satisfies a uniformity criterion at step 403. The uniformity criterion is preferably a maximum contrast threshold, and may be satisfied when the calculated difference at step 402 is below this contrast threshold. The contrast threshold may be predetermined and is preferably set to a value of 10, 20 or 30, or any number between 10 and 30. A contrast threshold of 20 is particularly advantageous because it allows for low frequency noise in the background to be present, whilst filtering out higher contrast changes due to text-to-background transitions and/or high frequency noise (such as dithering). Ideally, the maximum contrast threshold used in the segment detection process is different to the minimum contrast threshold used in the edge detection process.

If the uniformity criterion is satisfied at step 403, the current pixel is considered to belong to the same segment as the previous pixel, and accordingly the segment of the previous pixel grows by one pixel at step 404. Of course, if the previous pixel is not already part of a segment, a new segment is created at step 404 to include the previous pixel and the current pixel. If the uniformity criterion at step 403 is not satisfied, step 406 permanently stops the growth of the segment of the previous pixel. In this way, it will be appreciated that each segment may only contain pixels which sequentially change by less than the contrast threshold.

At step 405, the segment detection method increases the value of a line sum based on the length of the current segment (i.e. the segment associated with the current pixel). Preferably, a fraction of the current segment length is added to the line sum. For example, the line sum may be increased according to logical expression [4], preferably as the segment detection method analyses the line of pixels.

$$\text{line sum} \mathrel{+}= x/\text{divider} \qquad [4]$$

Where x is the current segment length, and the divider is a predetermined integer such as 1 or 10, or any number therebetween.

It will be appreciated that expression [4] provides a triangular number of x. It will also be seen that when the divider is chosen to be 1, then the total value added to the line_sum when a segment stops growing will be given by expression [5].

$$\text{line\_sum} = x*(x+1)/2 \qquad [5]$$

It will further be appreciated that a new line sum is calculated for each new line analysed by the segment detector. In addition, it will also be seen that each time a segment grows, its length (or preferably a fraction of the length) at that time is added to the line sum. In this way, longer segments are given more weight. Accordingly, since uniform backgrounds (with or without text) are expected to have longer segments, it will be seen that these regions are given more weight in the line sum. Thus, it will also be seen that the segment detection process provides weighted lengths of each segment that it detects.

At step 407, the segment detection process analyses the next pixel along the line, if present. Once the process finishes analysing the line, it may of course be applied to another line of the image/window.

Although not shown in FIG. 4, the segment detection process may also update/generate the elements of an integration (e.g. summed-area) table and/or an equivalent circular buffer; preferably according to logical expression [6] if analysing horizontal lines, and preferably according to logical expression [7] if analysing vertical lines. Separate tables/buffers are preferably generated/updated for the vertical lines and the horizontal lines. Further, the elements of the integration tables/buffers are ideally updated/generated as the segment detection process sequentially analyses each line of pixels (e.g. after step 405 and before step 407).

$$\text{Element}(x,y) = \text{Element}(x,y-1) + \text{line sum} \qquad [6]$$

$$\text{Element}(x,y) = \text{Element}(x-1,y) + \text{line sum} \qquad [7]$$

Where:
Element (x, y) is the element of the table/buffer associated with the image/window pixel at coordinates (x, y);
Element (x, y−1) represents the line sum according to logical expression [5] at the time of analysing pixel (x, y−1);
Element (x−1, y) represents the line sum according to logical expression [5] at the time of analysing pixel (x−1, y); and
line sum is the line sum given by logical expression [5].

Based on expressions [6] and [7], it will be appreciated that a given element of the integral table/buffer may store the sum of the line sums (e.g. the sum of the triangular number of segment lengths) calculated by the segment detection process up to, and including, the point of analysing the pixel associated with the given element. It will also be understood that since the line sums provide weighted segment lengths, the sum of the line sums is a weighted sum.

The sum of the line sums is used when detecting a dithered region, for example. And, like with the edge counts, the integral table/buffer provides a quick and efficient way of determining the sum of the line sums when needed, but the methods herein are not limited to using integral tables/buffers for this determination.

Figure 5:
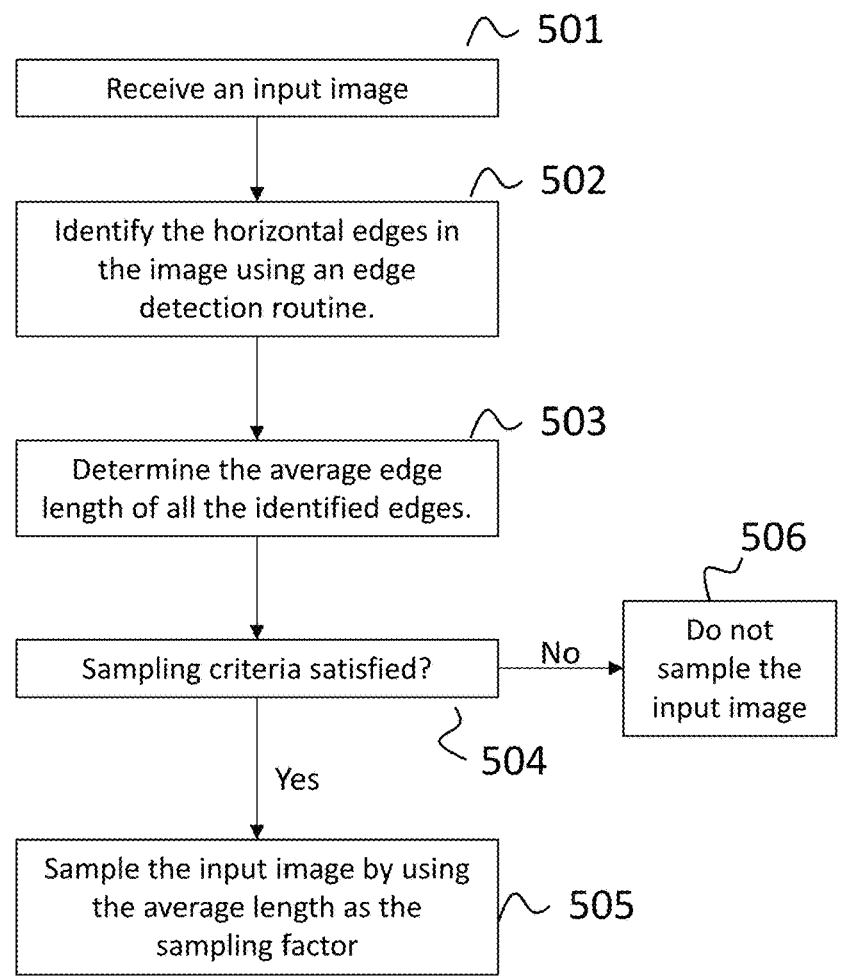
FIG. 5 is a sampling process according to an example of the present invention.

FIG. 5 shows an optional sampling method which samples an input image 15 to provide a lower resolution image. A benefit of downsampling an input image in this way is that it provides faster and more accurate edge detection in subsequent edge detection processes (e.g. in the edge detection step of FIG. 6). It also provides faster segment detection.

At step 501, the sampling process receives an input image 15. It is assumed that the input image 15 is in grey scale and, if required, was converted from colour into grey scale before the input image 15 is received at step 501. This conversion may be done by the image processing apparatus 20.

At step 502, the edge detection process of FIG. 3 is applied to each row of the input image 15 in turn (e.g. from top to bottom) to detect the horizontal edges and determine their respective edge length. At step 503, the sum of all the edge lengths is divided by the total number of horizontal edges to determine an average edge length. Preferably, the edge lengths are summed directly as they are calculated during the edge detection process. However, the sum of the edge lengths can alternatively be determined by using an integration table of the edge lengths or an equivalent circular buffer. As discussed previously, the integration table/circular buffer may be generated as part of the edge detection process.

At step 504, the sampling method determines whether the average edge length calculated at step 503 and the number of detected horizontal edges satisfy respective sampling criteria. The criteria for the average edge length is satisfied when the average edge length is less than a maximum sampling factor and not equal to two. The criteria for the number of horizontal edges is satisfied when the number of horizontal edges exceeds a minimum number of edges.

Setting a minimum number of horizontal edges requirement in this way ensures that the average edge length is meaningful.

If the sampling criteria at step 504 is satisfied, the input image 15 is sampled at step 505 to form a lower resolution, sampled image by using the average pixel length calculated at step 503 as the sampling factor. Any standard sampling method may be used for this. It will be appreciated that the requirements of the sampling criteria ensure that the average pixel length provides an optimal sampling factor.

If the sampling criteria at step 504 is not satisfied, the sampling process decides not to sample the input image 15 (step 506). However, the calculated average pixel length may be used in subsequent processes such as in the edge determination steps of FIGS. 6 and 7.

It will be appreciated that whilst the sampling method of FIG. 5 is based on analysing horizontal edges, the sampling method may alternatively be based on analysing vertical edges.

An example of a dithered region identification process will now be described with reference to FIG. 6. This method preferably uses a sliding window technique to analyse different portions/regions of an image in turn. The image may be the input image 15 or the sampled image. At each window position a determination is made as to whether or not the portion of image pixels within the window belong to a dithered region of the image. This determination may be based on a characteristic of the edge(s) in the window and/or a characteristic of the level of uniformity in the region. For example, the determination may be based on the number of edges within the window and/or a characteristic of the uniform segment(s) in the window such as the sum of the length(s) of the uniform segments within the window. To provide good accuracy, it is preferred for the above determination to be based on both the characteristic of the edge(s) in the window and the characteristic of the level of uniformity in the region. However, it will be appreciated that certain examples may make the determination based on either of these characteristics alone.

At step 601, an input image is received. It is assumed that the received input image 15 is in greyscale or has already been converted from colour into greyscale by, for example, the image processing apparatus 20.

At step 602, the input image 15 is optionally sampled to produce a lower resolution, sampled image. Preferably the input image is sampled using the sampling method of FIG. 5. If the input image 15 is not sampled, the remaining steps of FIG. 6 may be directly applied to the input image 15 instead of the sampled image.

At step 603, the process proceeds to sequentially centre a sliding window over each pixel of the input/sampled image. For a 300 dpi input/sampled image, the window is preferably 65 pixels by 65 pixels in size. This window size is ideal for analysing images of documents (e.g. A4 documents) because it generally captures background data and one or more portions of text. However, other window sizes may of course be used and, if the image resolution is less than 300 dpi the window size may be reduced. If the input image is sampled, the window size may be scaled according to the sampling factor (e.g. the average edge length). Preferably, however, the minimum size of the window is 17 pixels by 17 pixels. In certain examples or applications, the window size may be the same as the image size.

At step 604, the process proceeds to determine whether the window is positioned over a dithered region of the input/sampled image, based on a characteristic of the edge(s) in the window and/or a characteristic of the level of uniformity in the region. In this example, the determination at step 604 uses the steps outlined in FIG. 7 which, as will be seen, requires the total number of horizontal and vertical edges in the window.

The horizontal and vertical edges in the window are preferably detected by applying the edge detection process of FIG. 3 to each of the rows and columns in the window. The total number of horizontal and vertical edges in the window may then be determined by using an integration table or an equivalent circular buffer that is generated/updated during the edge detection process. Preferably, however, a circular buffer is used for faster detection. It will be appreciated that a skilled person knows how the integration table and the circular buffer may be used to determine the total number of vertical/horizontal edges. For example, the skilled person will appreciate that the elements of the integration table/buffer which correspond to the image pixels at the corners of the window may be used to calculate the total number of horizontal/vertical edges in the window based on, for example, logical expression [8].

$$\text{sum\_topLeft} + \text{sum\_bottomRight} - \text{sum\_topRight} - \text{sum\_bottomLeft} \quad [8]$$

Wherein:
sum_topLeft is the value of the element which corresponds to the pixel at the top left corner of the window;
sum_bottomRight is the value of the element which corresponds to the pixel at the bottom right corner of the window;
sum_topRight is the value of the element which corresponds to the pixel at the top right corner of the window; and
sum_bottomLeft is the value of the element which corresponds to the pixel at the bottom left corner of the window.

At step 701, the process determines whether the number of horizontal edges in the window and the number of vertical edges in the window satisfy a dithered region criterion. The dithered region criterion is given by logical expression [9], which compares the number of vertical edges (nbOfVerticalEdges) to a minimum threshold (minNumberOfEdges) and the number of horizontal edges (nbOfHorizontalEdges) to the minimum threshold. As will be seen, the dithered region criterion is satisfied when both the number of vertical and horizontal edges exceed the minimum threshold (minNumberOfEdges).

$$\text{windowHasDitheredBackgroundWithorWithoutText} = \\ (\text{nbOfHorizontalEdges} > \text{minNumberOfEdges}) \\ \&\& (\text{nbOfVerticalEdges} > \text{minNumberOfEdges}) \quad [9]$$

The minimum threshold (minNumberOfEdges) is dependent on (i) the area of the image which is covered by the window (windowArea) and (ii) an expected minimum percentage of the edges in the window (minimumEdgesPercentage), in accordance with logical expression [10].

$$\text{minNumberOfEdges} = \\ (\text{windowArea} * \text{minimumEdgesPercentage})/100 \quad [10]$$

It will be appreciated that although the window is a fixed size, the window may at times cover different sized areas of the image. For example, the window may cover a smaller area of the image when centred on a corner pixel of the image in comparison to when the window is centred in the middle of the image. Accordingly, the number of edges that can be contained in a window may vary according to the window position. To account for this variation, it is beneficial to make the minimum threshold dependent on windowArea and/or minimumEdgesPercentage.

In certain examples, the minimum threshold (minNumberOfEdges) may optionally be scaled based on the average edge length in the window (averageEdgeLengthInWindow) according to, for example, expression [11]. Preferably, the average edge length is based on the length of the horizontal edges and/or the length of the vertical edges in the window. Further preferably, the scaling occurs when the input image is not sampled at step 602.

minNumberOfEdges=minNumberOfEdges/
(averageEdgeLengthInWindow*averageEdgeLengthInWidow) [11]

At step 702, a further check is done to determine whether the ratio of number of horizontal edges to the number of vertical edges satisfies a threshold ratio (ratioHoriVsVertiEdgesBelowThreshold). A suitable criterion for this check is given by logical expression [12], which imposes a max ratio of 1.5. If the ratio of the number of horizontal edges to the number of vertical edges is less than the threshold ratio, the threshold ratio criterion is satisfied. The threshold ratio criterion can be used to look for certain shapes of dithered regions. In general, dithered regions are round and therefore the threshold ratio can be set to look for round regions wherein the number of vertical edges are expected to be similar to the number of horizontal edges. Accordingly, an advantage of applying the threshold ratio criterion to the dithered region detection process is that it improves the accuracy of determining whether a region of pixels is dithered. A further advantage is that the ratio can be used to avoid falsely determining a dotted line in a region of the image to be a dithered region, by selecting an appropriately low threshold ratio.

ratioHoriVsVertiEdgesBelowThreshold=
((nbOfHorizontalEdges>nbOfVerticalEdges)?
(2*nbOfHorizontalEdges<=3*nbOfVerticalEdges):
(2*nbOfVerticalEdges<
(3*nbOfHorizontalEdges))) [12]

At step 703, the uniformity of the pixels in the window is analysed to determine whether the level of uniformity satisfies a uniformity threshold criterion. The level of uniformity in the window may be determined based on the lengths (preferably the weighted lengths) of the uniform segments in the window.

The uniform segments and their lengths are preferably determined by applying the segment detection method of FIG. 4 to each row/column of pixels in the window, and then determining the sum of their weighted lengths (e.g. the sum of the triangular number of their lengths). As mentioned previously, an integration table/circular buffer may be used to determine the sum of the weighted lengths.

The pixels in the window are determined to mostly contain ununiform segments when the sum of the weighted segment lengths in the window (segmentLengthValue) is less than a maximum segment length threshold (maxSegmentLengthValue), in accordance with expression [13].

shortSegmentsOnly=segmentLengthValue<maxSegmentLengthValue [13]

When the pixels in the window are determined to mostly contain ununiform segments, the uniformity threshold criterion is not satisfied. Conversely, the window may be determined to contain mostly uniform segments when segmentLengthValue>maxSegmentLengthValue. In this case, the uniformity threshold criterion is satisfied.

The principal behind the above criterion check is that, if a window does contain dithering (with or without text), then there is generally almost no 'long' segments due to the dithering noise. While, if the background is uniform, there will generally be at least some longer segments (e.g. due to the white space between lines of text and/or the white space surrounding lines of text). In the segment detection process, it will be seen that the longer a segment gets, the heavier it's weight will be. Consequently, in this way, it can be ensured that the uniformity threshold criterion will likely be satisfied whenever there are a few longer segments (or one very long one).

It will also be appreciated that the maxSegmentLengthValue is designed that if the window contains just one uniform segment that has the same length as the width of the window, the uniformity threshold criterion will likely be satisfied.

It will also be appreciated that the maxSegmentLengthValue depends on the width of the window, because it is assumed that the segment detection process is applied to the horizontal lines. However, if the segment detection process is applied to the vertical lines, it will be understood that the maxSegmentLengthValue will depend on the window height.

It will also be understood that the maximum allowable segment length will increase with window width/height.

In certain examples, preferably when the input image is not downsampled at step 602, the maxSegmentLengthValue may be scaled based on the average edge length in the current window position, in accordance with expression [14].

maxSegmentLengthValue=maxSegmentLengthValue*
(averageEdgeLengthInWindow*average Edge-
LengthInWindow) [14]

If the criteria in steps 701 and 702 are satisfied and the criteria in step 703 is not satisfied, the process identifies the current window position to be over a dithered region of the input image at step 704. If the one or more of the criteria in steps 701, 702 and 703 are not satisfied, the process identifies the current window position to be over a non-dithered region.

Referring back to FIG. 6, when step 604 has determined that the current window position is over a dithered region, the process identifies which pixel in a dithering identification mask is co-located with the centre pixel of the current window position at step 605. The identified pixel is then set to black to mark this pixel as a pixel in a dithered region. It will be appreciated that the mask has the same size and pixel resolution as the image to which the sliding window is applied. Accordingly, it will be seen that the marked pixel and the pixel at the centre of the window at step 604 share the same image coordinates.

At step 606, if the input image is sampled, the process identifies an area of the original input image (i.e. the input image before it is sampled) which corresponds to the same area of the sampled image over which the current sliding window is positioned. In this way, the corner pixels of the identified region will of course be the same as the corner pixels of the window. The identified area in the original input image is then analysed using the edge detection process to determine the local average edge length of that region.

If the input image is not sampled, then it will be appreciated that the sliding window is already positioned over the original input image. In this case, the identification step can be omitted and the local average edge length can be calculated from the pixels in the window.

At step 607, the average local edge length is added to a total of all the average local edge lengths. It will be appreciated that this total is only based on the average edge lengths in regions which have been determined to be dithered.

When step 604 determines that the current window position is over a non-dithered region, the process identifies which pixel in a dithering identification mask is co-located with the centre pixel in the current window position at step 609. The identified pixel is then set to white, or any other colour which is different to the colour set at step 605.

Step 610 determines whether the sliding window has been sequentially centred over each pixel in the input/sampled image. If there are still some pixels remaining, the process proceeds to centre the sliding window over the next pixel at step 608.

Figure 6:
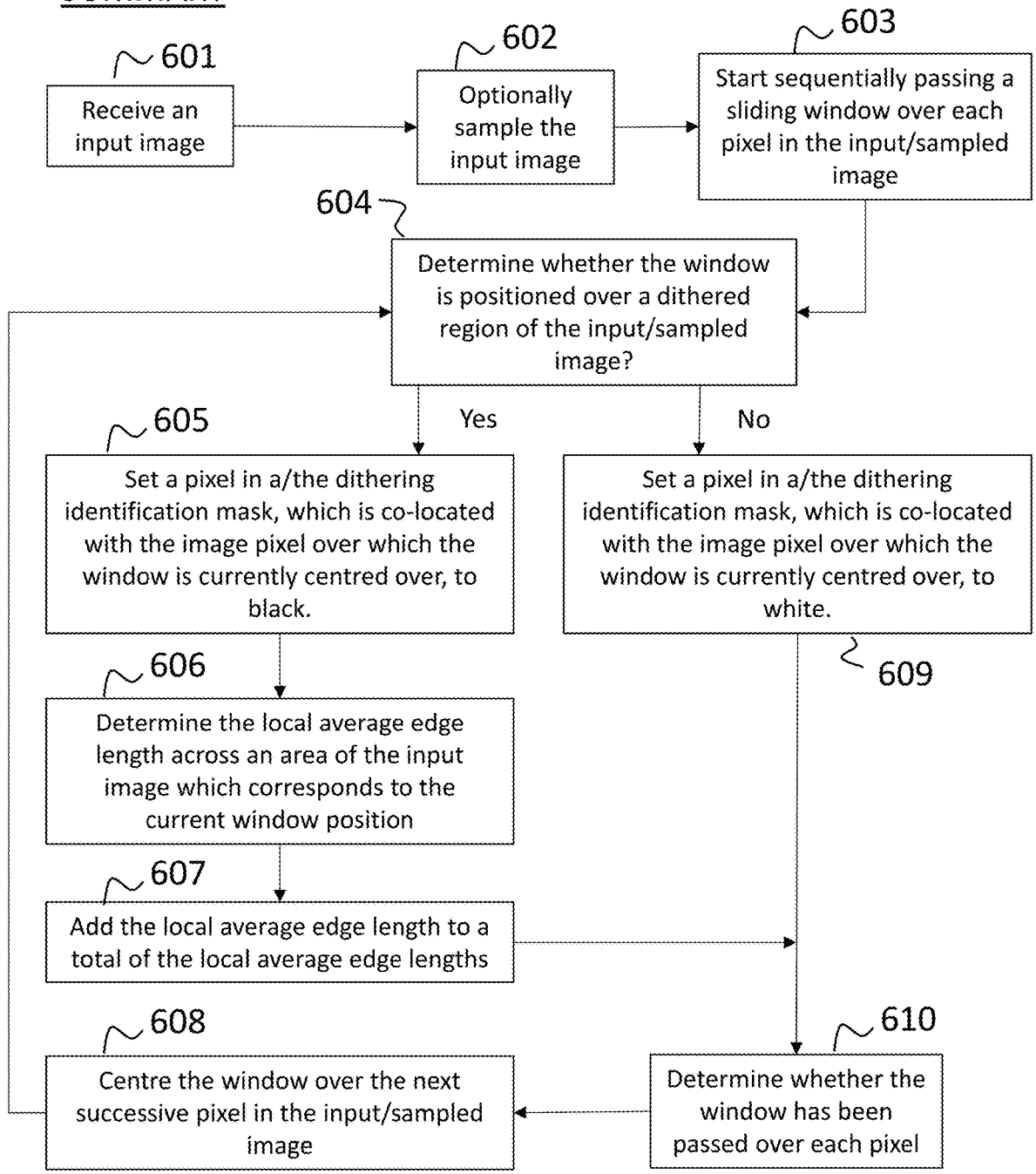
FIG. 6 is a dithered region identification process according to an example of the present invention.

Once the process in FIG. 6 is completed, it will be appreciated that the black pixels of the dithering identification mask will indicate the dithered regions of the input image, and the white pixels will indicate the non-dithered regions. This is advantageous as it allows subsequent image processing techniques to target these regions for processing. For example, an adaptive binarization process can be selectively applied to the black regions identified in the dithering identification mask. Additionally, or alternatively a dither removal process such as a smoothing process can be selectively applied to the regions of the image which correspond to the black regions in the dithering identification mask. An example of selectively applying a smoothing function to the black zones of the dithering identification mask is described in FIG. 8.

If the dithering identification mask has been generated based on a sampled image, the mask may optionally be upsampled, using any standard upsampling process. To improve the mask, a number of morphological operators may also be applied to it. For example, a closing operator may be applied to the mask to close gaps in the mask which are smaller than a given maximum number of pixels. Additionally, or alternatively, an erosion operator may be applied to erode away small black zones which are smaller than a given size. These small black zones may likely be false detections and thus it is beneficial to remove them. Additionally, or alternatively, a dilation operator may be applied to restore the black zones to their original size.

Figure 8:
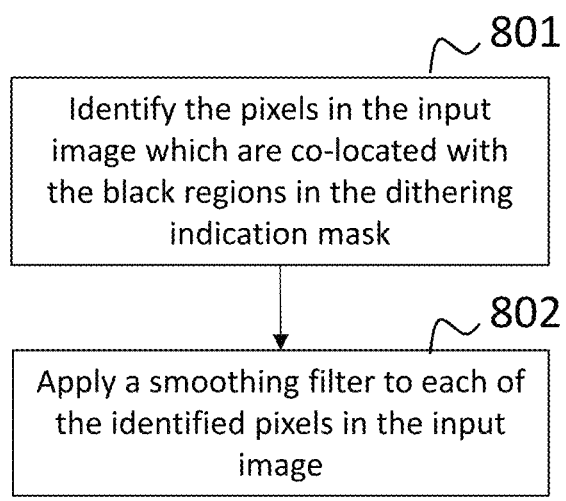
FIG. 8 is a dither removing process according to an example of the present invention.

FIG. 8 shows a dither removing process. At step 801, the process identifies which of the pixels in the original input image correspond in position with the black pixels in the dithering identification mask—i.e. the dithering identification mask is used to map out which of the pixels in the original image are dithered.

At step 802, a smoothing function is applied to each of the identified pixels in the original image. The smoothing function can be a standard smoothing function. The smoothing radius for controlling the level of smoothing applied by the smoothing function is preferably based on an average edge length. The average edge length is ideally the average edge length across all of the identified dithered regions, rather than an average edge length across the entire image—this is advantageous because it provides a more accurate smoothing radius for selectively smoothing the dithered regions in the image. The average edge length may be calculated using the total local average edge length calculated at step 607. If, however, a different smoothing radius or average edge length is used, it will be appreciated that steps 606 and 607 may be omitted from the process of FIG. 6.

More generally, it will be understood that any parameter of a dither removal process which controls the level of the dither removal can be based on an average edge length, such as the average edge length across all of the identified dithered regions or the local average edge length in an identified dithered region.

Optionally, after the image is smoothed, it may then be binarized. It will be appreciated that the selective smoothing process will result in an improved quality binary image, which can subsequently be passed to an OCR process for improved character recognition results. However, it will be appreciated the advantages of the processes described herein may also be useful for other image processing techniques, such as object detection. For example, a dithered identification mask, a smoothed image or a binary image which has been generated according to the examples herein may be useful for improving the accuracy of an object detection process.

The invention claimed is:

1. A method for processing a dithered image comprising a grid of pixels, the method comprising:
    defining an array of pixels corresponding to a sub-region of the dithered image;
    performing edge detection along the rows and the columns of the array;
    counting the number of edges detected along the rows of the array to determine the number of horizontal edges in the array;
    counting the number of edges detected along the columns of the array to determine the number of vertical edges in the array;
    identifying whether the sub-region is dithered based on the number of horizontal and vertical edges in the array;
    determining the average length in the corresponding sub-region of the image;
    setting a level of a dither removal process based on the determined average edge length; and
    selectively processing the corresponding sub-region of the image based on whether or not the sub-region is identified to be dithered, wherein the selective processing of the corresponding sub-region of the image comprises applying the dither removal process to the sub-region of the image when the sub-region is identified to be dithered.

2. The method as claimed in claim 1, wherein the step of identifying whether a sub-region is dithered comprises determining whether the number of horizontal edges and the number of vertical edges each exceed a predetermined threshold count.

3. The method as claimed in claim 2, further comprising determining the average edge length in the array, and wherein the predetermined threshold count is scaled based on the determined average edge length.

4. The method as claimed in claim 1, wherein the step of identifying whether a sub-region is dithered comprises determining whether the number of horizontal edges relative to the number of vertical edges exceed a predetermined ratio.

5. The method as claimed in claim 1, further comprising detecting segments of similar pixels in the lines of the array, wherein the difference in pixel value between neighbouring pixels in a segment is less than a predetermined contrast threshold; and
    wherein the step of identifying whether the sub-region is dithered is further based on the lengths of the segments.

6. The method as claimed in claim 5, wherein:
    the lengths of the segments are weighted according to their size; and
    the step of identifying whether the sub-region is dithered comprises determining whether the sum of the weighted lengths is greater than a predetermined sum threshold.

7. The method as claimed in claim 6, further comprising:
performing edge detection along the lines of the array and determining the average edge length in the array, and wherein the predetermined sum threshold is scaled based on the determined average edge length.

8. The method as claimed in claim 1, wherein the dither removal process comprises applying a smoothing function to the corresponding sub-region of the image.

9. The method as claimed in claim 1, comprising:
if the sub-region is identified to be dithered, setting a pixel of a mask to a first value, wherein the set pixel is co-located with the centre pixel of the sub-region of the image.

10. The method as claimed in claim 9, comprising:
if the sub-region is not identified to be dithered, setting a pixel of the mask to a second value, wherein the set pixel is co-located with the centre pixel of the sub-region of the image.

11. The method as claimed in claim 1, comprising:
binarizing the processed image to generate a binary image for subsequent processing.

12. The method as claimed in claim 1, comprising performing an object detection process on the processed image.

13. The method as claimed in claim 1, wherein the defined array of pixels is a selected sub-region of pixels of the image.

14. The method as claimed in claim 1, comprising sampling the image to provide a sampled image, and wherein the defined array of pixels is a selected sub-region of pixels of the sampled image.

15. The method as claimed in claim 14, wherein the image is sampled according to a sampling factor based on the average edge length of the horizontal and/or vertical edges in the image.

16. The method as claimed in claim 1, wherein the step of defining an array of pixels comprises applying a sliding window function to the image.

17. A non-transitory computer readable medium having a computer program stored thereon to implement a method for processing a dithered image comprising a grid of pixels, the method comprising:
defining an array of pixels corresponding to a sub-region of the dithered image;
performing edge detection along the rows and the columns of the array;
counting the number of edges detected along the rows of the array to determine the number of horizontal edges in the array;
counting the number of edges detected along the columns of the array to determine the number of vertical edges in the array;
identifying whether the sub-region is dithered based on the number of horizontal and vertical edges in the array;
determining the average length in the corresponding sub-region of the image;
setting a level of a dither removal process based on the determined average edge length; and
selectively processing the corresponding sub-region of the image based on whether or not the sub-region is identified to be dithered, wherein the selective processing of the corresponding sub-region of the image comprises applying the dither removal process to the sub-region of the image when the sub-region is identified to be dithered.

* * * * *